United States Patent [19]

Karlson et al.

[11] 3,734,421
[45] May 22, 1973

[54] MULTIPLE RATIO SELECTOR SYSTEM

[75] Inventors: Harald Karlson, Santa Monica; William B. Goldsworthy, Palos Verdes; Tim T. Hegyi, Hawthorne, all of Calif.

[73] Assignee: Goldsworthy Engineering, Inc., Torrance, Calif.

[22] Filed: Apr. 12, 1971

[21] Appl. No.: 133,061

[52] U.S. Cl. ............... 242/7.21, 156/189, 156/446, 242/158 R, 242/DIG. 1, 318/39, 318/571, 318/640
[51] Int. Cl. ............................................. B65h 81/08
[58] Field of Search ................. 242/7.21, 7.22, 7.23, 242/2, 3, DIG. 1, 158 R; 156/189, 172, 446, 443, 429, 361, 429; 318/571, 39, 640

[56] References Cited

UNITED STATES PATENTS

| 2,964,252 | 12/1960 | Rosenberg | 318/571 X |
| 2,757,884 | 8/1956 | Bryant | 242/DIG. 1 |
| 3,057,566 | 10/1962 | Braden | 156/361 X |
| 2,182,717 | 12/1939 | Chance | 318/640 |
| 3,250,493 | 5/1966 | Burkley et al. | 242/7.21 |

Primary Examiner—Billy S. Taylor
Attorney—Robert J. Schaap, John D. Upham and Joseph D. Kennedy

[57] ABSTRACT

A multiple ratio selector system for use in filament winding systems of the type where filaments from a traversing feeding eye is wound about a rotatable mandrel. The ratio selector system includes a pair of photo sensitive diodes which move with the feeding eye and detect the presence of positionally located photo reflective surfaces during their traversing movement with the feeding eye. On each occasion where a reflective surface is detected by one of the photo sensitive diodes, a position signal is generated and a direction mechanism permits passage of the position signal corresponding to the direction of movement of the proper photo sensitive diode. This position signal operates a stepping switch driver which, in turn, causes the rotation of a stepping switch. A multiple ratio selector is connected to the various outputs of the stepping switch and in turn drives the traversing feeding eye through a servo valve.

9 Claims, 2 Drawing Figures

Patented May 22, 1973

INVENTORS
HARALD KARLSON
W. B. GOLDSWORTHY
TIM T. HEGYI

BY Robert J. Schaap

ATTORNEY

MULTIPLE RATIO SELECTOR SYSTEM

BACKGROUND OF THE INVENTION

This invention relates in general to certain new and useful improvements in filament winding systems, and more particularly, to an improved multiple ratio selector system for use in filament winding systems.

In recent years, reinforced plastic products have achieved increasing prominence in many industries. It is now common to find reinforced plastic underground storage tanks which have replaced the previously employed underground tanks formed of steel and other heavy metals. In like manner, reinforced plastic pipe and reinforced plastic pressure bottles, and other structural members, have been substituted for the previously accepted tanks, pipes, bottles and the like which were formed of the heavy metals. Products formed of the reinforced plastics which generally include a filament reinforcing material and a curable resin matrix have been found to include an inherent number of advantages over their previously accepted metal counterparts. For example, the reinforced plastic products generally include higher degrees of burst strengths, withstand substantially greater pressure loadings. Furthermore, the reinforced plastic products are generally more capable of withstanding corrosion effects to a substantially greater degree than their metal counterparts.

In the formation of tubular articles, the fiber strands are generally wound upon a mandrel having the overall shape and size of the reinforced plastic article to be produced. Generally, a feeding eye which carries the filament strand is reciprocatively shifted longitudinally with respect to the mandrel, during rotation of the mandrel, for winding the filament about the mandrel. In like manner, it is also possible to orbit or rotate the feeding eye about a fixed mandrel for winding about the cylindrical sidewall of the mandrel. When it is desired to wind about all surfaces of the mandrel, it is often times necessary to rotate the mandrel in a direction perpendicular to its longitudinal axis.

Both of the previously described winding systems are conventional and are highly effective in filament winding about a mandrel which has a continuous cross-sectional shape. However, if the mandrel includes diameterally reduced or diameterally enlarged portions or portions which form an irregular surface in the mandrel, it is necessary to change the ratio of the strand feed with respect to the rate of rotation of the mandrel. In the past, numerical control devices have been employed in order to achieve this continually changing rate of strand feed. However, while numerical control devices are effective, they are also quite expensive and materially increase the overall cost of the winding device. In many cases, the addition of a numerical control assembly for changing feeding to winding ratios often increases the price of the winding machine to a point where the same becomes economically prohibitive.

It is, therefore, the primary object of the present invention to provide a multiple ratio selector system which is capable of continually changing the feeding to winding ratio for various surface contours of a mandrel.

It is another object of the present invention to provide a ratio selector system of the type stated, which does not employ highly expensive digital type numerical control systems.

It is a further object of the present invention to provide a multiple ratio selector system of the type stated, which is highly effective in its operation and which can be manufactured at a relatively economical cost.

It is an additional object of the present invention to provide a multiple ratio selector system of the type stated, which lends itself to physical and visual adjustment in order to render a highly accurate ratio change selectivity.

It is another slient object of the present invention to provide a method of continually changing the ratio of a feeding-winding pattern for various curvatures of a mandrel receiving the filament strand.

With the above and other objects in view, our invention resides in the novel features of form, construction, arrangement and combination of parts presently described and pointed out.

DETAILED DESCRIPTION

Figure 1:
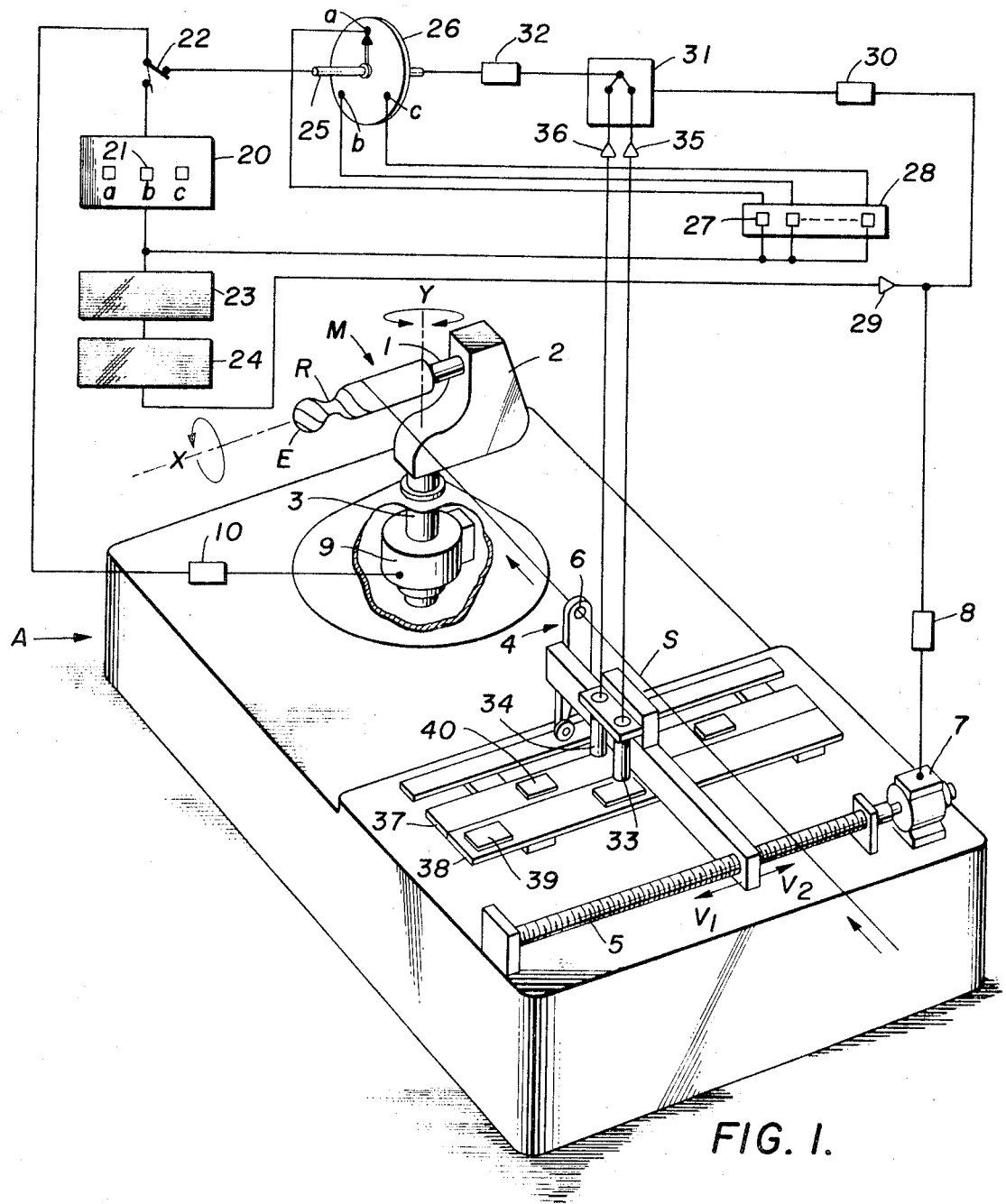
FIG. 1 is a schematic view of a multiple ratio selector system constructed in accordance with and embodying the present invention.
Figure 2:
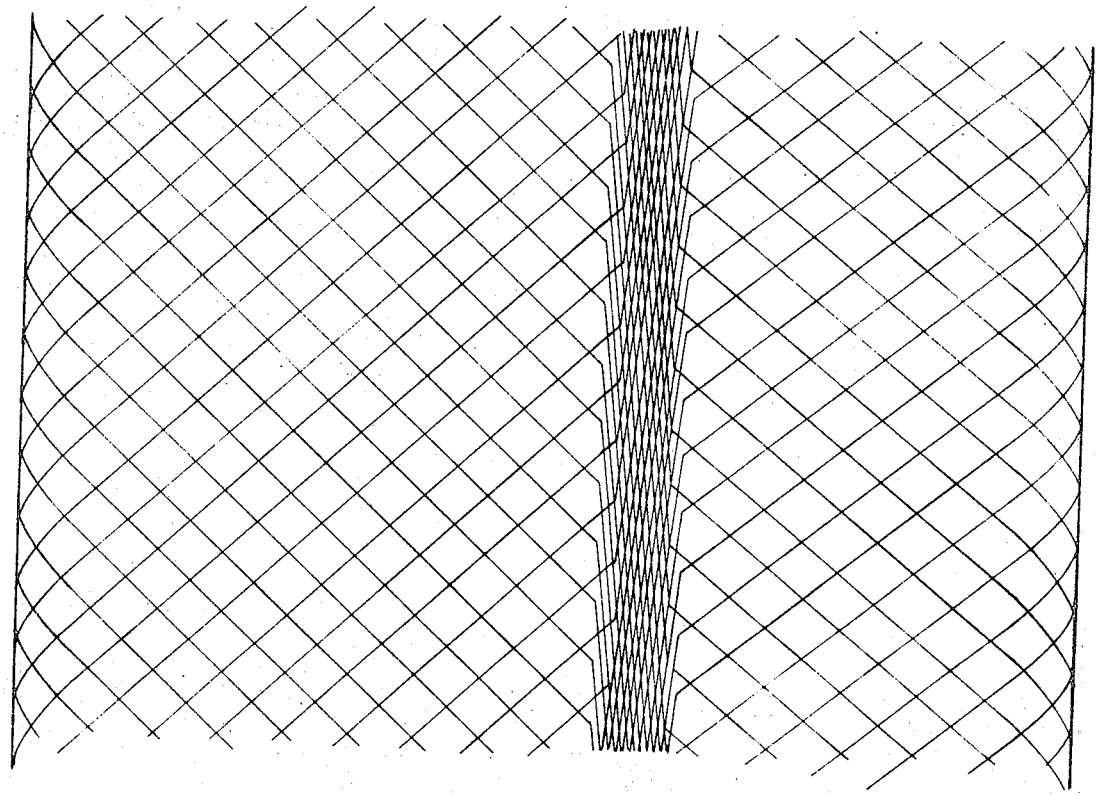
FIG. 2 is a view of a portion of a winding pattern which can be achieved by employment of the multiple ratio selector system of the present invention.

Referring now in more detail and by reference characters to the drawings, A designates a multiple ratio selector system for winding about a mandrel M of the type illustrated in FIG. 1. The mandrel M will generally form part of a filament winding apparatus and is mounted in a cantilever position on a mandrel support shaft 1 for rotation about its longitudinal axis X. The mandrel support shaft 1 is connected to a conventional gear box 2 containing an assembly for operatively connecting the mandrel shaft 1 to a drive shaft 3. In this manner, the mandrel shaft 1 can be rotated about its axis so that the mandrel M is rotated about the longitudinal axis X. In like manner, through suitable controls (not shown), the mandrel M can be rotated about an axis Y which is the axis of rotation of the drive shaft 3. Thus, it can be seen that the mandrel M can be rotated about its longitudinal axis in the planes containing an axis X and can also simultaneously or individually be rotated about planes containing the axis Y.

The filament winding machine would also include a feeding head 4 which is longitudinally shiftable along a guide bar 5 and would contain a feeding eye 6. The feeding head 4 is driven by a suitable mechanism (hereinafter described) for longitudinal shifting movement along the guide bar 5. Thus, the feeding head 4 would be shifted longitudinally to one end position on the guide bar 5 where the direction of travel is changed so that the feeding head 4 is shifted to the opposite end position and where the reciprocative shifting movement is continually performed at a selected rate. A strand of material S is introduced into the feeding eye 6 and attached to the mandrel M for winding about the mandrel M. Thus, it can be seen that as the mandrel M rotates, the feeding eye will shift longitudinally with respect to the axis X of the mandrel M and will thereupon wind a filament strans around the mandrel M in the form of a helical pattern.

By further reference to FIG. 1, it can be seen that the feeding head 4 is driven by means of a hydraulic motor 7 controlled by a conventional servo valve 8. In like manner, the drive shaft 3 for controlling the mandrel M is operated by means of a suitable electric motor 9. The speed of rotation of the motor 9 is sensed by an optical encoder 10 which generates a digital output in response to the speed of the motor 9. In the conventional filament winding apparatus, the hydraulic motor 7 is connected to the electric motor 9 for operation in pretimed relationship.

The roving material may be resin impregnated by a suitable resin applicator (not shown) for applying a resin matrix to the roving strand S, prior to the winding about the mandrel M. In like manner, each of the strands of roving may be impregnated after application to the mandrel M. Any suitable resin matrix normally employed in reinforced plastic materials may be used for the resin impregnation.

Any continuous material or synthetic filament capable of being bent to conform to a desired shape can be employed in the present invention. The most preferred filament employed in this invention is that made of glass. However, it should be recognized that boron filaments, carbon and graphite filaments and filaments from lithium and other grown-whisker crystals can be employed. In addition, metal wire may be interspersed with a glass filament in the event that it is desired to add some type of metallic body to the fiber glass reinforced structure which is produced, such as for electrical conductivity. Furthermore, while the present invention has been described in terms of controlling the feed of a roving material, it should be recognized that this type of multiple ratio selector system is also useful in the winding of other materials where ratio selection is required.

In the actual winding operation, the feeding head 4 will reciprocatively shift longitudinally along the guide bar 5. It can be seen that where the feeding head is in alignment with the diametrally constant portion of the mandrel M, the ratio is constant; hence, the amount of strand per unit of time of rotation of the mandrel is constant. However, where the feeding eye shifts to alignment with the diameterally reduced portion R on the mandrel M, the amount of roving required per unit of time of rotation of the mandrel is reduced. In like manner, when the feeding eye 6 reaches alignment with the circular head end portion E on the mandrel M, the ratio is again changed, since the amount of strand per unit of time of rotation of the mandrel M also continually changes. Thus, the rotation of the mandrel M must be adjusted in accordance with the location of the feeding eye 6.

The multiple ratio selector system A of the present invention operates in conjunction with the aforesaid filament winding apparatus. The ratio selector system A generally includes the optical encoder 10 which is connected to the electrical motor 9. The optical encoder 10 may be optionally connected to a ratio selector switch 20 having a plurality of switch buttons 21, by means of a two-position switch 22. It can be seen that the ratio selector switch 20 has three switch positions designated as $a$, $b$ and $c$. The output of the ratio selector switch 20 is connected to a conventional pulse counter 23 which is, in turn, connected to a conventional digital-analog converter 24.

In like manner, the other position of the two-position switch 22 is connected to the rotating arm 25 of a stepping switch 26. By reference to FIG. 1, it can be seen that the stepping switch 26 has three contact positions designated as $a,b$ and $c$. It should be observed that these switch positions on the stepping switch 26 conform to the switches 21 on the ratio selector switch 20.

Each of the switch positions $a$, $b$ and $c$ has contacts connected to individual ratio selector circuits 27 on a multiple ratio selector 28 in the manner as illustrated in FIG. 1. Again, each of these ratio selector circuits 27 corresponds to the individual switch positions $a$, $b$ and $c$ and the stepping switch 26 and which also in turn conform to the three switches 21 on the ratio selector switch 20. Furthermore, the output of each of these selector circuits 28 is connected to a point intermediate to the ratio selector switch 20 and the pulse counter 23.

When continually changing feed ratio selection is not required, the movable arm of the two-position switch 22 is shifted to the position as illustrated in the dotted lines of FIG. 1. In this case, the desired feed ratio is selected by actuation of any of the switches $a$, $b$ or $c$ on the ratio selector switch 20. In this connection, it should be noted that the ratio selector switch 20 is not necessarily limited to three different feeding ratios, but can conventionally include as many ratios as is desired.

The output of the digital-analog converter 24 is connected through an amplifier 29 to the servo valve 8 for operating the servo valve 8 and, hence, the hydraulic motor 7 in timed relation to the speed of rotation of the electical motor 9. Furthermore, the output of the digital-analog converter 24 is connected through the amplifier 29 to a direction sensor 30 (generally in the form of a diode circuit) and to a multiplexing switch 31. The multiplexing switch 31 generally includes a series of by-stable elements, such as flip-flops, which either "set" or "reset" the switch 31. In like manner, the output of the multiplexing switch 31 is connected to a stepping switch driver 32 which is, in turn, connected to the rotary arm 25 of the stepping switch 26.

A pair of photo sensitive diodes 33,34 are physically connected to the feeding head 4 and movable therewith, for reasons which will presently more fully appear. The output of each of these diodes 33,34 is connected through photo amplifiers 35,36 to the multiplexing switch 31 in the manner as illustrated in FIG. 1. Thus, the photo sensitive diodes 33,34 will reciprocatively shift longitudinally with the feeding head 4. A pair of non-reflective mounting strips 37,38 are mounted on the filament-winding machine in a position beneath the photo sensitive diodes 33,34 and in the line of travel of the photo sensitive diodes 33,34. The strips 37,38 are preferably of metallic construction for receiving removable magnetic bars 39,40. The bars 39,40 each include an upper photo reflective surface for reflecting the light from a conventional light source (not shown). The light source should provide a point source of radiation. By reference to FIG. 1, it can be seen that the photo sensitive diode 33 will sense the position of each of the photo reflecting magnets 39 when the feeding head 4 is travelling in one position, that is, the position designated by the arrow $V_1$ and the photo sensitive diode 34 will detect the position of each of the photo reflective magnets 40 when the feeding head 4 is travelling in the opposite position, that is, the position designated by the arrow $V_2$ in FIG. 1.

It can be seen that as the motor 9 is energized, it will rotate the drive shaft 3 and hence the mandrel M about the axis X. The speed of rotation of the motor is detected by the optical encoder 10. If continually changing feed ratio selection is not desired, the movable arm of the two-position switch 22 is shifted to the position as illustrated in the dotted lines of FIG. 1. In this case, the speed of rotation of the mandrel M will be constant at a ratio pre-established by actuation of the proper switch *a, b* or *c* on the ratio selector switch 20. Accordingly, the speed of movement of the feeding eye 4 will be established at a proper ratio with respect to the operating speed of the motor 9.

The encoder 10 will generate a number of pulses in response to the speed of rotation of the motor 9 and these pulses will be counted by the pulse counter 23 in accordance with the proper switch position selected on the ratio selector switch 20. Furthermore, these pulses will generate an analog signal in the digital-analog converter 24 and will, hence, operate the servo valve 8 in response to the speed of the motor 9. In like manner, the servo valve 8 will cause the hydraulic motor 7 to rotate in timed relationship to the speed of rotation of the motor 9. Hence, it can be seen that the rate of movement of the feeding head 4 is synchronized to the speed of rotation of the mandrel M about its axis X and in accordance with the ratio selected on the ratio selector switch 20.

When the movable arm of the two-position switch 22 is shifted to the position in the solid lines of FIG. 1, the continually changing multiple ratio selector system is introduced into the overall system. In this mode of operation, the output of the encoder 10 is introduced into the stepping switch 26. Thus, the stepping switch 26 which is continually operated by means of the stepping switch driver 32 will continually change the multiple ratio selector circuits 27 in the multiple ratio selector 28. Furthermore, the output of the direction sensor 30 will detect the direction of movement of the feeding head 4. Thus, when the feeding head 4 is moving in the direction $V_1$, the photo sensitive diode 33 will detect the position of the photo reflective magnets 39. As the photo sensitive diode 33 detects a magnet, a position pulse is generated through the photo amplifier 35 and causes the multiplexing switch 31 to either become "set" or "reset" in accordance with the direction of movement of the feeding eye 4. A signal from the direction sensor 30 will operate the multiplexing switch 31 and the output of the amplifier will operate the servo valve 8 and hydraulic motor 7 for regulating the speed of movement of the feeding head 4.

When the feeding head 4 is moving in the direction $V_2$, the photo sensitive diode 34 will detect the position of the photo reflective magnets 40. This will, in turn, generate a signal, amplified by the photo amplifier 36, to multiplexing switch 31. The direction sensor 30 will cause the multiplexing switch 31 to enable a proper position signal from the amplifiers 35,36 to be transmitted to the stepping switch driver 32. It should be recognized that any number of mangets 39 and 40 could even be employed to correspond to the number of ratio selector circuits 27 and the multiple ratio selector 28 and thereby continually change the ratio of strand material to the rate of rotation of mandrel M. Furthermore, it should be observed that since the magnets 40 are removably located on the strips 37,38, they can be easily shifted in position to conform to desired ratio changes with respect to the mandrel M.

It should be understood that changes and modifications can be made in the form, construction and arrangement and combination of parts presently described and pointed out in the claims, without departing from the nature and principle of our invention.

Having thus described our invention, what we desire to claim and secure by Letters Patent is:

1. A multiple ratio selector system for use in strand winding systems of the type where filament containing strands are fed from a feeding member to a receiving member, said multiple ratio selector system comprising first radiation active means located with respect to changes in the contour of said receiving member, second radiation active means operatively associated with said feeding member and cooperating with said first radiation active means, sensing means for detecting the speed of movement of said receiving member, signal generating means operatively connected to said detecting means and generating a control signal to control the speed of movement of said feeding means in response thereto, position signal means operatively connected to said second radiation active means to generate a position signal in response to coaction between said first and second radiation active means, a stepping switch operable by said position signal, and a stepping switch driver operatively connected to said stepping switch and operating in conjuction therewith to control said control signal and the speed of movement of said feeding means in response to changes of contour of said receiving member.

2. The multiple ratio selector system of claim 1 further characterized in that the first radiation active means is removably located with respect to changes in contour of said receiving means.

3. A strand winding system for winding a filament containing strand about a receiving member from a feeding member, said system comprising drive means for causing relative movement between said feeding member and said receiving member to cause said strand to be wrapped about said receiving member, first radiation active means removably located with respect to changes in the contour of said receiving member, second radiation active means operatively movable with said one of said receiving member or feeding member and cooperating with said first radiation active means, a sequencing stepping switch operatively connected to said first radiation active means, a plurality of individual multiple ratio selector circuits selectively operatively connectable to said drive means, and a stepping switch driver operatively connected to said stepping switch and said multiple ratio selector circuits to enable proper operative interposition of the desired ratio selector circuit, to adjust the relative movement between said receiving member and feeding member responsive to the change of contour of said receiving member.

4. The strand winding system of claim 3 further characterized in that said individual multiple ratio selector circuits are selectively operatively connectable to said drive means to control the ratio of movement between said feeding member and receiving member.

5. The strand winding system of claim 4 further characterized in that means is connected to said driver means and selector circuits to control the direction of movement of said feeding member.

6. In a strand winding system where a strand of material is fed from a movable feeding member to a movable receiving member and the feeding member moves in timed relation to the receiving member, and which system includes motive means for moving the receiving member and means for moving the feeding member in timed relationship thereto to apply the strand from the feeding member to the receiving member; a multiple ratio selector system for changing the ratio of the rate of strand feed relative to movement between said feeding member and receiving member for changes in contour of said receiving member, said ratio selector system comprising a first photoelectric element positionally located to represent changes in the contour of said receiving member, a second photoelectric element movable with respect to said first photoelectric element to detect the presence of said first photoelectric element, sequencing means operatively connectable to said second photoelectric element, and a plurality of ratio controllers operatively connected to said sequencing means and connecting a selected one of said plurality of ratio controllers to said motive means to control said relative rate of movement in response to such changes of contour.

7. The ratio selector system defined in claim 6 further characterized in that the said first photoelectric element is a photoreflective element and said second photoelectric element is a light sensitive diode element.

8. The ratio selector system defined in claim 6 further characterized in that the said sequencing means comprises a stepping switch and a stepping switch driver.

9. A multiple ratio selector system for use in strand winding systems of the type where filament containing strands are fed from a feeding member to a receiving member, said multiple ratio selector system comprising a first radiation active means including a number of discrete radiation reflective elements, each of said reflective elements being removably located with respect to changes in the contour of said receiving member to change the rate of strand feed thereto in accordance with changes in contour thereof, second radiation active means operatively associated with said feeding member and cooperating with said first radiation active means, sensing means for detecting the speed of movement of said receiving member, signal generating means operatively connected to said detecting means and generating a control signal to control the speed of movement of said feeding means in response thereto, position signal means operatively connected to said second radiation active means to generate a position signal in response to coaction between said first and second radiation active means, a stepping switch, said having a number of switch positions at least equal to the number of reflective elements in said first radiation active means and being operable by said position signal, and a stepping switch driver operatively connected to such stepping switch and operating in conjunction therewith to control said control signal and the speed of movement of said feeding means in response to changes of contour of said receiving member.

* * * * *